United States Patent Office 2,764,866
Patented Oct. 2, 1956

2,764,866

USE OF PHOSPHORUS COMPOUNDS IN LEADED GASOLINE

Theodore B. Wasserbach, Cranford, and Raymond W. Walker, Union, N. J., assignors to Esso Research and Engineering Company, a corporation of Delaware No Drawing. Application January 2, 1953,
Serial No. 329,436

9 Claims. (Cl. 64—35.4)

The present invention relates to the prevention of corrosion of metals and metal alloys at elevated temperatures due to the presence of lead-containing compositions. More specifically, it concerns a method of preventing the corrosion of internal metal parts of a jet aircraft engine caused by the combustion of lead-containing fuels within the engine. It particularly relates to the introduction of phosphorus-containing compositions within the combustion and/or turbine sections of a turbo-jet or turbo-prop aircraft engine that is operated on leaded gasoline. It further relates to gasoline-type fuel compositions that contain volatile lead anti-knock compounds along with small amounts of hydrocarbon-soluble, phosphorus-containing compositions.

In the operation of jet-type aviation engines, it is general practice to use fuels that composition-wise are essentially hydrocarbon in nature. Occasionally, however, fuels that contain volatile lead compounds are also employed. The latter practice prevails particularly on naval aircraft carriers where, because of logistics, jet aircraft must frequently operate on leaded gasolines. This use of leaded gasoline in jet engines give rise to serious corrosion problems within the engines and particularly within the turbine sections of turbo-jet and turbo-prop type engines.

To best understand the present invention, it is felt desirable to first briefly describe the construction and operation of a jet aircraft engine. There are three basic types of jet engines—the ram-jet, the turbo-jet, and the turbo-prop. The present invention can be applied to each of these engine types, but it has particular application to the turbo-jet and turbo-prop engines. For the sake of illustration, the following description will be directed primarily toward a turbo-jet engine.

A conventional turbo-jet engine may be considered as consisting of the following main sections:

1. Air entrance section
2. Compressor section
3. Combustion section
4. Turbine section
5. Tailpipe section
6. Accessory section
7. Fuel system
8. Starting system
9. Ignition system
10. Cooling system
11. Lubrication system Of these sections, the present invention is primarily concerned with those sections that are subjected to temperatures above about 1400° F. in the presence of the fuel or its combustion products. Thus, the present invention has application to the combustion, turbine and tailpipe sections and especially to the turbine section of a jet engine. It will be noted that this invention has no application to conventional internal combustion engines, since the internal metal parts of such engines do not operate at the elevated temperatures characteristic of the aforementioned sections of a jet engine.

A turbo-jet aircraft engine operates in the following manner. Air flows through the air entrance section and into the compressor section where it is compressed to a pressure of about 45 p. s. i. g. to 180 p. s. i. g. The compressor may be of either the axial or centrifugal type. If of the centrifugal type it may, in addition, possess either a single or a double entry.

From the compression section the air flows into the combustion section where it is intimately mixed with fuel and its temperature increased by combustion of the fuel. The manner in which the fuel and air are mixed and burned will vary with the type of combustion chamber employed. In this connection, there are two basic types of combustion chambers (1) the type that employs a plurality of small combustion chambers popularly known as "cans," and (2) the annular type also known as the "burner basket" design.

In either type of combustion chamber design, the air is divided into two portions that are generally referred to as (1) the primary air, and (2) the secondary air. The fuel is mixed and burned with the primary air, and the combustion products thereby formed are then mixed with the secondary air. The resulting gasiform mixture then passes from the combustion section into the turbine section.

The various types of combustion sections are designed so that the weight ratio of primary air to fuel is kept within the limit necessary to permit and support combustion.

The weight ratio of the total air (e. g., primary air plus secondary air) to the fuel, however, is governed by factors other than those limiting the combustion process. For example, it is necessary to cool the combustion products from their flame temperature of about 3500°–4000° F. to a temperature of about 1400° F. before they can be permitted to enter the turbine section. This temperature reduction is mandatory, since the metals and alloys that are presently employed to construct a jet engine are not capable of withstanding temperatures much in excess of about 1400° F. To achieve this degree of cooling, it is conventionally necessary to use overall air/fuel ratios of the order of 50/1 or more.

It will be noted that lower air/fuel ratios and higher operating temperatures will probably be used as more stable metals and alloys become available for use in jet engines. The materials of construction presently employed are usually stainless steels containing large amounts of nickel and chromium or alloys such as "Vitallium" that contain chromium, nickel, cobalt, tungsten, molybdenum and the like. The limitations imposed upon a jet engine by these metals have already been discussed.

The turbine section may contain one or more rotors and one or more stages. In addition, the turbine blades may be of the impulse and/or reaction type and may or may not be shrouded.

The gases in passing through the turbine section cause the turbine rotor or rotors to turn and to drive the compressor in the compression section and also auxiliary equipment such as fuel pumps, lube oil pumps, generators, etc. It will be noted that approximately 80% of the useful power generated by a turbo-jet engine is normally utilized by the turbine to drive the compressor. The remaining power is then available to propel the aircraft. In a turbo-prop engine this remaining power is transmitted to and drives a propeller or, while in a turbo-jet engine it is realized in the form of a sheer jet action.

The gases leaving the turbine flow into the tailpipe section from whence they vent to the atmosphere. The tailpipe may have a single or double exit and may be of the variable orifice or adjustable exhaust nozzle type.

When the tailpipe is provided with an afterburner, it is essential that a variable exhaust opening be provided to adjust for both normal and afterburning conditions.

The tailpipe section normally operates at temperatures of about 900° to 1400°F. Inasmuch as the temperatures in this section are lower than those existing in the combustion and turbine sections, the materials employed here are generally not as temperature-resistant as the metals employed in the other two sections. For example, columbium-stabilized 18% Cr–8% Ni stainless steel finds wide application in the fabrication of this section.

A brief reference was made earlier to the occasional use of "afterburners" and "after-burning." It is well to point out at this time that these terms describe one method of augmenting the thrust normally developed by a jet engine. There are actually three conventional methods of thrust augmentation by which the output of a jet engine may be temporarily increased:

1. After-burning, or "tail pipe burning"
2. Air bleed-off
3. Use of power augmentation liquids It will be noted that all of these methods have primary application to turbo-jet and turbo-prop engines.

After-burning, briefly, consists of injecting and combusting a portion of fuel directly within the tailpipe section of an engine. In other words, this section is made to resemble a ram-jet, in that the combustion products formed here exit directly to the atmosphere without passing through a turbine.

When "afterburner" nozzles are provided in the tailpipe of a jet engine, a diffuser is usually placed between the turbine section and the nozzles. This device serves to redistribute the gas flow in the tailpipe and to promote better combustion of the fuel issuing from the afterburner nozzles.

The air-bleed-off system of power augmentation as applied to a turbo-jet engine employs a secondary or auxiliary ram-jet engine in addition to the primary turbine engine. In this system, a portion of the air from the compressor is fed to the secondary engine, combusted with fuel that is separately supplied to this engine, and additional thrust is thereby obtained. Water or a water-alcohol mixture is injected into the primary engine to replace the air diverted into the secondary engine. The water or water and alcohol mixture compensates for the air diverted from the primary engine and restores the full thrust of this engine.

In a sense, the air-bleed-off method of power augmentation is a combination of the methods that employ after-burning and power augmentation liquids. The first of these has already been described; the latter will be described briefly below.

Power augmentation liquids such as water and water-alcohol mixtures, are conventionally injected into the compressor-inlet or into the combustion chamber of a jet engine. When the engine employes a centrifugal compressor, these liquids are usually injected into the compressor; but when the engine employs an axial compressor, they are generally injected into the combustion chamber. In either event, they act to cool the gases entering the turbine section and therefore permit more fuel than normal to be burned within the combustion section without exceeding the temperature limits imposed by the turbine section. The total mass flow of gases and vapors passing through the jet engine is thereby greatly increased with the result that the power output and thrust of the engine are also increased.

A wider range of fuel compositions may be employed in jet-type aircraft engines than are used in the reciprocating-piston or internal-combustion type of engine. In general, it is desired that a jet fuel possess a low freezing point; that it not form coke upon combustion; that it burn with a stable flame; that it be non-corrosive; and that it contain a high BTU content per gallon.

A set of fuel specifications tentatively proposed by the commercial airlines indicates the general properties that are considered at present to characterize a satisfactory jet fuel. These properties are as follows:

1. Freezing point _____ −40°C. max.
2. Kinematic viscosity _____ 6 centistokes max. @ 18°C.
3. Flash point _____ 38°C. min.
4. Sulfur content _____ 0.20% by wt. max.
5. Corrosion _____ Only slight discoloration of copper strip.
6. Gravity _____ No specification.
7. Accelerated gum _____ 20 mg./100 ml. max.
8. Residue (air-jet method) _ 10 mg./100 ml. max.
9. Aromatics content _____ 20% max.
10. Water tolerance _____ Substantially immiscible.
11. Distillation:
    Percent off at 410°F.___ 10% min.
    Final b. pt., °F._____ 550–600
    Loss _____ 1½% max.
12. Heat of combustion _____ 18,300 B.t.u./lb., min.

Other specifications for standard jet aircraft fuels include those given in MIL–F–5616, MIL–5624A and MIL–F–7914.

As mentioned earlier, aviation gasoline is also employed as a jet engine fuel and particularly in the jet engines of aircraft that are stationed on naval aircraft carriers. As has also been mentioned, aviation gasoline contains volatile lead compounds that give rise to serious corrosion problems in the combustion, turbine and tailpipe sections of a jet engine. The most acute problem is the one existing within the turbine section.

Little is known concerning the mechanism by which lead compositions in a fuel cause corrosion of the internal parts of a jet engine. It is theorized that the lead compositions or compounds react to form solid, non-volatile, ash-like materials that deposit upon the interior walls of the combustion section, the blades and other parts of the turbine section and on the interior walls of the tailpipe section. An interaction then apparently occurs between the lead compounds and the metallic engine parts that results in extensive corrosion and pitting of the parts.

Accordingly, it is an object of the present invention to render the combustion products of aviation gasoline substantially non-corrosive toward the internal metal parts of a jet engine. More broadly, it is an object of the present invention to reduce the corrosiveness of lead-containing vapors toward metals and metal alloys at elevated temperatures of say 1400°F. and above.

In accordance with the present invention, the above objects are achieved by the introduction of phosphorus-containing compositions within any zone in which metals and metal alloys are exposed to and corroded by lead-containing compositions at temperatures above about 1400° F. More specifically, the objects are achieved by introducing phosphorus compositions within such a zone to an extent such that the number of atoms of phosphorus per atom of lead is at least 3 to 1 and is preferably at least about 5 to 1. It is particularly desired that any ash existing within the zone have a phosphorus to lead content of at least about 3 atoms of phosphorus per atom of lead and preferably at least about 5 atoms of phosphorus per atom of lead. It is further desired that the phosphorus-containing compositions that are added within such a zone be characterized by the fact that they are readily converted to an oxide of phosphorus, especially $P_2O_5$, under the thermal conditions existing within the zone.

Phosphorus compositions suitable for the practice of the present invention may be selected from either the organic or inorganic classes of phosphorus compounds that are readily converted to oxides of phosphorus under the conditions described earlier herein.

Similarly, a variety of methods may be employed for introducing the phosphorus-containing compositions within the combustion and/or turbine sections of a turbo-jet or turbo-prop aircraft engine. For example, suitable inorganic phosphorus compounds such as finely divided $P_2O_3$, $P_2O_4$, $P_2O_5$, ammonium phosphate and the ammonium acid phosphate (all having a particle less than 10 microns and preferably less than 5 microns) may be introduced in the air being supplied to the combustion zone. This addition of solid particles may be done in any conventional manner.

When a jet engine makes use of water or water-and-alcohol mixtures as power augmentation liquids, phosphorus compositions may be introduced within the engine by inclusion in these power augmentation liquids. In this instance, it is preferred that the phosphorus compositions be soluble in the liquids. Suitable compounds include ammonium phosphate and the ammonium acid phosphates.

Still another method of introducing phosphorus within the combustion or turbine section of a jet engine consists in the direct and separate injection of either an inorganic or organic phosphorus composition. A preferred method of phosphorus introduction, however, consists in incorporating a hydrocarbon-soluble form of phosphorus in the lead-containing fuel being supplied to the engine.

The present invention has particular application to leaded aviation gasolines when they are employed as fuels in jet aircraft engines, especially of the turbo-jet and turbo-prop types. The general properties and characteristics of these gasolines are well known in the art. Typical inspections, for example, may be found in ASTM Specification No. D910–51T. It will be noted that this specification calls for gasolines having from 2 to 4.6 ml. of lead tetraethyl per gallon of gasoline. It will also be noted that the tetraethyl lead is added in the form of a fluid mixture containing not less than 61% by weight of tetraethyl lead and sufficient ethylene dibromide to provide 2 bromine atoms per atom of lead. In general, an aviation gasoline may contain up to about 3.5 grams of lead per gallon of gasoline.

The present invention also has application to other types of leaded fuels that may be used in jet aircraft, as, for example, automotive gasolines. As in the case of aviation gasolines, the general characteristics and properties of automotive gasolines are also well known in the art. Typical inspections may be found in ASTM Specification No. D439–50T. This specification does not reveal the amounts of tetraethyl lead that an automotive gasoline may contain, but such a fuel may contain up to about 2.5 ml./gallon of tetraethyl lead.

Phosphorus compounds that are suitable for inclusion in a lead-containing hydrocarbon fuel and particularly in a leaded aviation gasoline include the hydrocarbon-soluble substituted phosphines, phosphates, phosphites, phosphonium salts, phosphine oxides, phosphonites, phosphinates, phosphonates, and phosphinites. Suitable substituted groups include the alkyl, alkenyl, and aryl radicals; and one or more of these groups may appear in the same additive molecule. Furthermore, where more than one of these groups occur in the same molecule, each similar group may contain a different number of carbon atoms.

Hydrocarbon-soluble phosphorus compounds that are particularly attractive for use within a leaded hydrocarbon fuel include the mono-, di-, and tri-alkyl esters of phosphoric and phosphorous acids in which the alkyl groups contain from 1 to 4 carbon atoms. Similarly attractive are the mono-, di-, and tri-aryl esters of phosphoric acid and the phosphorous acid, particularly where the aryl groups consist of the phenyl, toluyl, xylyl or cresyl radicals.

Inasmuch as jet fuels are conventionally introduced by means of direct injection within the various sections of a jet engine, the boiling range or boiling point of the phosphorus composition is not extremely critical. It is desirable, however, that the phosphorus composition not have a boiling point in excess of about 800° F. so as to prevent as much as possible any carbon deposition within the engine. With a composition that boils above this temperature, complete combustion of the composition may be difficult to realize.

In addition to the phosphorus compounds enumerated above, it is contemplated that phosphorus-containing compositions of the types obtained by phosphorizing various petroleum fractions and oxygen-bearing organic compounds may also be employed for the purposes of this invention. For example, petroleum fractions such as gasolines and kerosenes that contain substantial amounts of aromatics as well as light gas oils and neutral and pale oils may be phosphorized by treatment with $P_2O_5$ at about 200° C. for 2 hours or more. In a like manner, it is contemplated that oxygen-bearing organic compounds such as oxidized hydrocarbons, naphthenic acid, lauryl alcohol, phenol, cresols, benzyl alcohol, fatty acids such as lard oil, stearic acid, etc. may be phosphorized employing the reaction conditions stated above.

To demonstrate the effectiveness of phosphorus in inhibiting the corrosiveness of lead and lead-containing compositions toward metals, a series of tests were carried out according to the following procedure. A weighed steel strip (SAE type 30304 containing 18% chromium and 8% nickel) was partially immersed in a weighed quantity of lead oxide in a porcelain crucible, and the crucible then placed in a muffle furnace for 48 hours at about 1650° F. The furnace atmosphere was then displaced with air at a rate sufficient to change the atmosphere in the furnace about 100 times each hour. At the end of the 48-hour test period, the steel strip was descaled electrolytically in molten caustic, washed, dried and weighed. Similar steel strips were then immersed in other porcelain crucibles, each containing the same weighed quantity of lead oxide plus various amounts of phosphorus pentoxide. These samples were then placed in the muffle furnace and subjected to the same heating and atmospheric conditions as before. The results of this series of tests are shown below:

| Atomic Ratio, Phosphorus/Lead | Weight Loss of Strip Relative to PbO Alone [1] |
| --- | --- |
|  | 100 |
| 1/1 | 68 |
| 3/1 | 59 |
| 5/1 | 6 |

[1] PbO alone causes about a 9–10 wt. percent loss of the stainless steel strip.

In the above table, it may be readily seen that phosphorus in the form of $P_2O_5$ is extremely effective in reducing the corrosiveness of lead oxide toward stainless steel. It may be further seen that while phosphorus/lead atomic ratios up to about 3 to 1 are moderately effective in reducing the corrosiveness of lead, phosphorus/lead atomic ratios in excess of 3 to 1 are extremely effective in this connection.

It will be noted that the expression "phosphorus/lead atomic ratio" is not intended to convey the impression that the phosphorus and lead are present in elemental form, but instead to designate the quantitites of each that are desired regardless of the particular chemical form or forms in which they occur.

It will also be noted that while the present description has been concerned primarily with turbo-type jet engines, the present invention may also be utilized in other types of jet engines and combustion chambers that are operated under the conditions prevailing in a turbo-engine. Likewise, the present invention may be applied to fuels that contain lead compositions other than lead tetraethyl. For example, lead tetramethyl and the various methyl ethyl lead alkyls may also be employed.

What is claimed is:
1. A leaded hydrocarbon fuel composition adapted for combustion in a jet-type aircraft engine including up to about 3.5 grams of lead per gallon of fuel and an amount of a hydrocarbon-soluble phosphorus compound such that the ash produced upon combustion of the fuel composition contains at least about 5 atoms of phosphorus per atom of lead.

2. A composition as defined in claim 1 in which the hydrocarbon-soluble phosphorus compound boils below about 800° F.

3. The method of preventing the corrosion of a metal that is exposed to lead-containing compounds in a zone where the temperature is in excess of about 1400° F. which comprises introducing into said zone an amount of a phosphorus-containing compound such that the atomic ratio of phosphorus to lead deposited on said metal within said zone is at least about 5 to 1, said phosphorus-containing compound being of the character to provide an oxide of phosphorus at said temperature within said zone.

4. In the operation of a jet-type aircraft engine using a lead-containing hydrocarbon fuel, the method of preventing corrosion of internal metal parts of the engine that operate at temperatures in excess of 1400° F. in the presence of lead-containing compounds which comprises introducing within the engine a phosphorus compound in an amount such that the atomic ratio of phosphorus to lead deposited on said metal parts is at least 5 to 1, said phosphorus compound being of the character to provide the phosphorus in the form of an oxide of phosphorus at said temperatures.

5. A fuel as defined in claim 1 in which the phosphorus compound is selected from the class consisting of the mono-, di-, and tri-alkyl and the mono-, di-, and tri-aryl esters of phosphoric and phosphorous acids.

6. A fuel as defined in claim 1 in which the phosphorus compound is tri-cresyl phosphate.

7. The method of preventing the corrosion of metal surfaces within a zone operating at temperatures in excess of about 1400° F. and in the presence of lead-containing compounds which comprises introducing within said zone a finely divided phosphorus oxide, said phosphorus oxide being introduced in an amount sufficient to provide an atomic ratio of phosphorus to lead of at least 5 to 1 within said zone.

8. The method as defined in claim 7 in which the phosphorus oxide has a particle size not in excess of about 5 microns.

9. The method of preventing the corrosion of metal surfaces that are maintained at temperatures in excess of about 1400° F. and in contact with lead containing compounds which comprises contacting the metal surfaces with an amount of a phosphorus-containing, hydrocarbon-soluble compound such that the atomic ratio of phosphorus to lead deposited upon said metal surfaces within said zone is at least about 5:1.

References Cited in the file of this patent

UNITED STATES PATENTS

| | | |
|---|---|---|
| 2,301,370 | Cook et al. | Nov. 10, 1942 |
| 2,375,218 | Fry et al. | May 8, 1945 |
| 2,427,173 | Withrow | Sept. 9, 1947 |
| 2,560,542 | Bartleson et al. | July 17, 1951 |
| 2,563,305 | Britton et al. | Aug. 7, 1951 |
| 2,573,471 | Malina et al. | Oct. 30, 1951 |

FOREIGN PATENTS

| | | |
|---|---|---|
| 421,568 | Canada | July 18, 1944 |
| 683,405 | Great Britain | Nov. 26, 1952 |

OTHER REFERENCES

The American Bulletin of Interplanetary Society, No. 16, February 1932, pp. 8–10 incl.

Astronautics, No. 26, May 1933, p. 6.

Wilkinson: Diesel Aviation Engines, National Aeronautics Council, Inc., N. Y. (1942), p. 81 (footnote 15).

Griffin "Control of Lead Fouling in Aero-Engines," pub. in Shell Aviation News, March 1952.